2,493,770

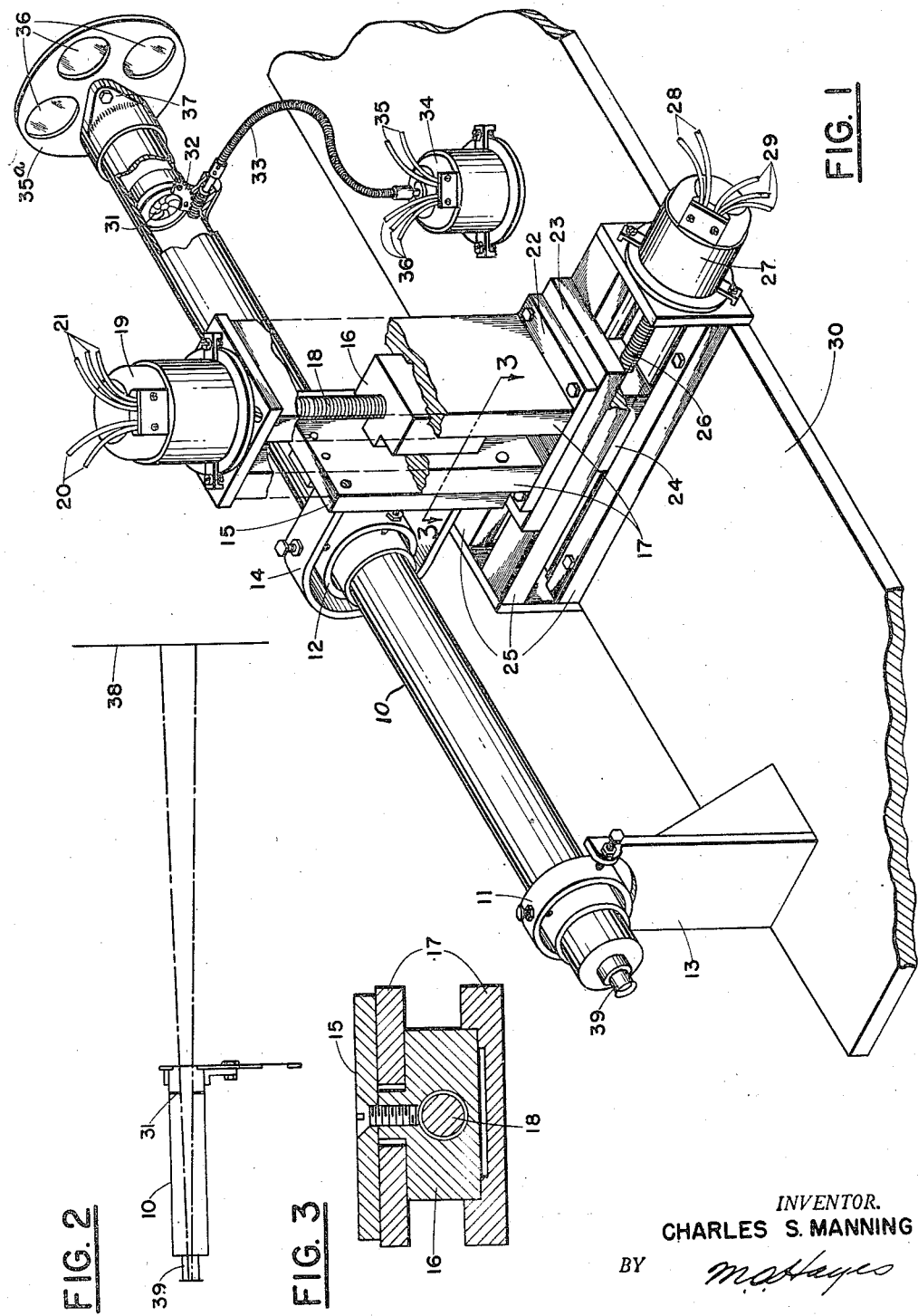
Jan. 10, 1950     C. S. MANNING     2,493,770
SIMULATED PANORAMA VIEWER
Filed Jan. 23, 1946
INVENTOR.
CHARLES S. MANNING
BY M. A. Hayes
ATTORNEY Patented Jan. 10, 1950

UNITED STATES PATENT OFFICE 2,493,770

SIMULATED PANORAMA VIEWER

Charles S. Manning, United States Navy

Application January 23, 1946, Serial No. 642,957

5 Claims. (Cl. 88—1)

(Granted under the act of March 3, 1883, as amended April 30, 1928; 370 O. G. 757)

This invention relates to means for simulating the view from an aircraft observer's station of a projected scene and more particularly to means for varying the location, size and visibility of the area viewed.

In the training of naval personnel, it has been found advantageous to project on a screen the images of ships independently controlled from a remote station to move on true courses at correct speeds. It is desirable with such training equipment to obtain a restricted view of the screen to simulate that seen from a scouting airplane. It is essential that this field of view move across the screen along a desired path in response to remote control. The area of view should also increase with an increase in the simulated altitude of the plane. To enhance the realism further, the visibility should be reduceable in accordance with the adverse weather conditions to be reproduced, such as fog, clouds, etc.

It is known in the optical art to provide devices which permit the viewing of a selected area only, such as a camera view finder. However, the present invention deals with a viewing apparatus which has many features not found in a conventional view finder and which is used for a different purpose with different results.

An object of this invention is to provide simple and easily operable means for moving an area of visibility about a view screen in accordance with the course and speed of an imaginary plane.

Another object is to provide means for varying the size of the area viewed in accordance with the apparent height of the plane from which the view is simulated.

A further object is to provide means for varying the visibility in accordance with the weather conditions to be imitated such as fog, clouds, etc.

The invention also resides in features of construction, combination, and arrangement herein described or disclosed, whereby simple and easily operable means are provided for varying the location, size and visibility of a desired field of view.

While the invention is susceptible of various modifications and alternative constructions, I have shown in the drawings and will herein describe the preferred embodiment. It is to be understood, however, that I do not intend to limit the invention by such disclosures for I aim to cover all modifications and alternative constructions falling within the spirit and scope of the invention as defined in the appended claims.

In the drawings:

Fig. 1 is an isometric drawing of the viewing tube.

Fig. 2 is a schematic arrangement.

Fig. 3 is a horizontal section on line 3—3 of Fig. 1.

Fig. 1 shows a viewing tube 10 mounted at the viewing end on a universal support consisting of gimbals 11 which are suspended in a fixed vertical element 13. The central or medeal portion of the tube is mounted in gimbals 12 which are suspended in bracket 14 on vertically moving saddle 15 of an adjustable rest. Ball and socket means could of course be substituted for either or both sets of gimbals, but an attribute of the latter is that they provide an immediate and circumannular support for the viewing tube with a high degree of stability therefor.

A vertical movement is provided by attachment of saddle 15 to threaded member 16 which rides on rails 17 and is actuated by screw 18 which is driven by servomotor 19. Power is supplied to the motor from a suitable source through leads 20 and control is afforded by leads 21 which are connected to a suitable remote control device.

Horizontal movement is provided by attachment of end block 22 and saddle 23 to threaded member 24 which rides on rails 25 and is actuated by screw 26 which is driven by servomotor 27. Leads 28 go to a suitable source of current and leads 29 are connected to a remote control device. The vertical and horizontal movement drives are mounted on base 30, the operation of the drives being to adjust the rest in two major directions in the plane transverse of the viewing tube.

An adjustable iris 31 is located in the outer end of the tube. The opening is decreased or increased by gear 32 and worm 33 through flexible drive from servomotor 34 which is connected by leads 35 to a power source and by leads 36 to a suitable remote control device.

A wheel 35a carrying indicia disks 36 which stimulate various visibility conditions such as fog, clouds, etc. is rotatively mounted on arm 37 at the end of the tube. Turning the wheel sufficiently far registers the desired disk 36 with the viewing tube.

Fig. 2 shows the restricted view obtained through the tube of a screen 38 on which a view is projected. The tube is located a substantial distance from the screen in order to reduce any errors caused by the varying angle of the tube. The view is restricted by iris 31 and circular eyepiece 39. Suitable lenses may be used in the eyepiece 39 and the tube to improve the control of the area of view.

In use, the tube is maneuvered on the course and speed of an imaginary plane by operation of the horizontal or vertical movement drives or both. When so maneuvered, the viewing tube is pointed at various areas of the projected scene and the view simulates that seen from a moving plane.

The motor 34 which controls iris 31 is coordinated with the simulated rate of climb of the plane. As altitude increases, the area of view is increased by an increase in the iris opening.

The wheel 35 may be rotated to bring one of the disks in line with the tube opening to stimulate a desired condition of visibility.

The invention described herein may be manufactured and used by or for the Government of the United States of America for governmental purposes without the payment of any royalties thereon or therefor.

I claim:

1. A viewing device for use with a projected scene, comprising a tube having a single eyepiece at one end, a gimbal support providing a universal mounting for the eyepiece end of the tube, a laterally extending arm at the other end of the tube, a gimbal mounting for the tube medially of said support and said other end of the tube providing for angular motion of the tube in reference to said support, a member turnably mounted on said arm having indicia disks registrable with said other end of the tube for interposing a chosen indicia effect between the eyepiece and said scene, means for moving said gimbal mounting horizontally and vertically to produce the angular motion of said tube, and an iris diaphragm in the tube behind said member for restricting the view of the scene.

2. A viewing device for observing a projected scene and simulating varying conditions of size, visibility and location of the area viewed comprising a tube having an eyepiece at one end, universal mountings at the eyepiece end and medially of the other end of the tube, means for moving said medial mounting horizontally and vertically to provide angular motion to the other end of said tube, a plurality of indicia disks rotatably mounted on said other end of the tube and registrable therewith for interposing said disks between the eyepiece and said scene, and adjustable means within said tube between said eyepiece and said indicia disks whereby said angular motion varies the location and said indicia disks vary the visibility and said adjustable means varies the size of the area viewed.

3. A viewing device for observing a projected scene and simulating varying conditions of size, visibility and location of the area viewed comprising a tube having an eyepiece at one end, universal mountings at the eyepiece end and medially of the other end of said tube, said medial mounting consisting of a plurality of motor driven screws positioned normal to each other to provide angular motion to the other end of said tube, a plurality of indicia disks rotatably mounted on said other end of the tube and registrable therewith for interposing said disks between the eyepiece and said scene, and adjustable means within said tube between said eyepiece and said indicia disks whereby said angular motion varies the location and said indicia disks vary the visibility and said adjustable means varies the size of the area viewed.

4. A viewing device for observing a projected scene and simulating varying conditions of size, visibility and location of the area viewed comprising a tube having an eyepiece at one end, universal mountings at the eyepiece end and medially of the other end of the tube, means for moving said medial mounting horizontally and vertically to provide angular motion to the other end of said tube, a laterally extending arm at the other end of the tube, a plurality of transparent disks simulating a plurality of atmospheric conditions, said disks being rotatably mounted on said extending arm and registrable with the other end of the tube for interposing said disks between the eyepiece and the scene, the disks acting to sequentially superimpose said atmospheric conditions on the scene, and adjustable means within the tube between said eyepiece and said transparent disks whereby said angular motion varies the location and said transparent disks vary the visibility and said adjustable means varies the size of the area viewed.

5. The device of claim 4 wherein the adjustable means consists of a motor driven iris diaphragm.

CHARLES S. MANNING.

REFERENCES CITED

The following references are of record in the file of this patent:

UNITED STATES PATENTS

| Number | Name | Date |
|---|---|---|
| 563,303 | Oehring | July 7, 1896 |
| 1,093,639 | McDougall | Apr. 21, 1914 |
| 1,201,813 | Fitzwilliam | Oct. 17, 1916 |
| 1,313,262 | Compere | Aug. 19, 1919 |
| 1,469,893 | Clapp | Oct. 9, 1923 |
| 1,761,361 | Oberg et al. | June 3, 1930 |
| 1,939,597 | Merrill | Dec. 12, 1933 |
| 2,089,901 | Kollmayer | Aug. 10, 1937 |
| 2,105,008 | Riley | Jan. 11, 1938 |
| 2,374,991 | Gordon | May 1, 1945 |
| 2,388,858 | Mac Neille et al. | Nov. 13, 1945 |
| 2,389,155 | Kerry | Nov. 20, 1945 |
| 2,392,781 | Simjian | Jan. 8, 1946 |
| 2,402,786 | Stearns et al. | June 25, 1946 |
| 2,406,550 | Long | Aug. 27, 1946 |
| 2,410,725 | Franklin | Nov. 5, 1946 |
| 2,424,011 | Gramont | July 15, 1947 |